United States Patent [19]

Meixner et al.

[11] Patent Number: 5,583,386
[45] Date of Patent: Dec. 10, 1996

[54] SAFETY CIRCUIT IN ELECTRICALLY OPERATED DEVICES

[75] Inventors: Hans-Werner Meixner, Wettenberg; Alexander Voit, Giessen, both of Germany

[73] Assignee: Pi-Patente GmbH, Entwicklung und Verwertung, Wettenberg, Germany

[21] Appl. No.: 137,149

[22] PCT Filed: Apr. 22, 1992

[86] PCT No.: PCT/EP92/00897

§ 371 Date: Apr. 20, 1994

§ 102(e) Date: Apr. 20, 1994

[87] PCT Pub. No.: WO92/19905

PCT Pub. Date: Nov. 12, 1992

[30] Foreign Application Priority Data

Apr. 25, 1991 [DE] Germany ............................ 41 13 487.7

[51] Int. Cl.⁶ ........................... H01H 35/00; H02H 5/00; H03K 17/96
[52] U.S. Cl. .......................... 307/326; 200/600; 173/170; 192/129 R; 307/140
[58] Field of Search ................ 200/600, 52 R, 200/52 A, 61–61.93, DIG. 2; 307/112–125, 326–328, 126–150; 192/129 A–131 R, 129 R; 361/23–50

[56] References Cited

U.S. PATENT DOCUMENTS

| | | | |
|---|---|---|---|
| 3,651,391 | 3/1972 | Vogelsberg | 318/446 |
| 3,737,670 | 6/1973 | Larson | 200/DIG 2 X |
| 3,787,732 | 1/1974 | Larson | 307/116 |
| 4,211,497 | 7/1980 | Montgomery | 400/486 |
| 4,236,086 | 11/1980 | Hoebel | 307/326 X |
| 4,493,377 | 1/1985 | Gunther et al. | 200/600 X |
| 4,584,519 | 4/1986 | Groudis | 307/116 X |
| 4,794,273 | 12/1988 | McCullough et al. | 307/139 |
| 4,859,869 | 8/1989 | Heuwinkel et al. | 307/117 |
| 4,965,693 | 10/1990 | Aoki | 361/42 |
| 5,013,891 | 5/1991 | Shoemaker | 307/326 X |
| 5,039,843 | 8/1991 | Muller | 200/61.45 R X |

FOREIGN PATENT DOCUMENTS

| | | | |
|---|---|---|---|
| 0052185 | 5/1982 | European Pat. Off. | F16P 3/20 |
| 2613270 | 10/1988 | France | F16P 3/16 |
| 2618371 | 11/1977 | Germany | H03K 17/00 |
| 2627663 | 12/1977 | Germany | H03K 17/00 |
| 2753314 | 5/1979 | Germany | H03K 17/96 |
| 3716623 | 9/1988 | Germany | H03K 17/965 |
| 3715497 | 11/1988 | Germany | D06F 75/26 |
| 2199962 | 7/1988 | United Kingdom | H05B 1/02 |

*Primary Examiner*—J. R. Scott
*Attorney, Agent, or Firm*—Edmund M. Jaskiewicz

[57] ABSTRACT

The invention discloses a safety circuit for electrically operated devices, which turns on the device in question, based on its position and design, only if handling and posture by the operator is completely correct and proper and the circuit, moreover, is static and insensitive to outside influences due to the use of sensor switches.

12 Claims, 6 Drawing Sheets

SAFETY CIRCUIT IN ELECTRICALLY OPERATED DEVICES

FIELD OF THE INVENTION

The present invention relates to a safety circuit in electrically operated devices, more particularly, to such a device having several interacting switch elements to enable current to flow to operate the device. These circuits are used with electrically operated devices to eliminate the risk of injury to the user in the event that the devices are handled improperly.

Such circuits generally provide that an operating current or at least a control current is directly switched. The switches themselves are usually mechanical in structure. However, it has been found that such known safety circuits have serious drawbacks and disadvantages as pointed out below.

One disadvantage is that activation requires only that one or more switches be depressed. If the user so desires, this is often done in practice, he can operate at least one switch by simply attaching insulating tape to maintain that switch in a depressed or activated state.

If larger safety devices are involved, in practice, an additional "bridge" is quite often installed by the users. If magnetic switches are involved, these are often rendered inoperative by add-on permanent magnets.

The voltages used in these devices often lie in a range that is dangerous to humans.

The mechanisms of such mechanical switches, and thus their function, are susceptible to external forces, such as atmospheric humidity, corrosion and fouling by dirt, dust or other small debris.

Because of their size, it is not always possible to position the switches optimally on the device.

According to U.S. Pat. No. 3,651,391, the embodiment in FIGS. 1 and 2 has a first sensor switch as an on-off switch, and a second sensor switch maintains the flow of current. This second switch is used solely as a safety switch.

The disadvantages of this prior art structure are rapidly apparent.

If the first switch (on-off switch) is turned on, the device can be activated unintentionally by accidentally touching the second sensor switch. There then exists a risk of injury to the user. To reduce this risk, at least one monitor must be provided in connection with the first one-off switch. Thus, this structure does not provide the safety objective according to the present invention and is, moreover, expensive.

In a second embodiment (FIGS. 5 and 6) of U.S. Pat. No. 3,651,391, two hands (body parts) are required to operate the device, one hand acutates only a first sensor switch and the other hand only a second sensor switch. In this embodiment, only the presence of the respective hand, but not its posture or position, is critical. It is not possible to require both the presence of a hand and a particular position of this hand with only one sensor switch per body part. This structure is therefore also not usable in a device that can be held and oeprated with only one hand.

This kind of contemplated safety is often circumvented by the user by short-circuiting one of the switches in order to increase the speed of the operating sequence.

According to the present invention, circumventing safety in this way is not possible. The present invention requires that the posture of each body to be predetermined.

According to a third embodiment (FIGS. 7, 8 and 9) of U.S. Pat. No. 3,651,391, two sensor switches are provided, both of which must be activated to produce a flow of current. One of the switches is provided to turn the device on and off. The second switch keeps the current flowing as long as it is touched. With this structure also, a situation can arise where the device is activated with the first swtich turned on by accidentally touching the second switch. Also, the posture of the body part here is by no means critical.

DE-PS (German Patent) 37 16 623 C1, discloses a tilt switch which allows a current to flow only if the switch reaches a certain angle of inclination. Such a tilt switch is utilized only as an auxiliary element, according to the present invention, which can replace one of the two contact elements as disclosed.

Contact elements (sensor switches) are basically known from DE 27 53 314 C2. In this patent specification, the function of a sensor switch is explained. According to the present invention, such a sensor swtich is, if necessary, improved to the extent of being able to operate in moist spaces. This is achieved by introducing a galvanic separation into the switch electronics. In DE 27 53 314 C2, no indication of the use of such a switch for safety circuits, such as those underlying the invention, is disclosed.

According to DE 26 27 663 C2, the metal foils are provided as switch elements, which work as follows: The metal foil lying on the outside of the device is touched by a person and consequently changes its mass, i.e., increases it. This changes the capacitance of the actuating element, which consists of the whole of the two metal foils together. In this way, the switching process is triggered. The second metal foil in this case lies inside and is not touched by the person. Also, this patent specification is not concerned with solving safety problems that are associated with the operation of a device.

SUMMARY OF THE INVENTION

The object of the present invention is to provide a safety circuit, by which an electrically operated device receives an operating current only if a predetermined, safe operating state is guaranteed, and to produce this state.

This object is thus in contrast with the usual prior art requirements, even according to the safety requirement of U.S. Pat. No. 3,651,391, wherein the flow of current that is present is interrupted if the device can no longer be handled safely.

The present invention provides for a predetermination of what is to be considered safe and thus proper handling. Safety is determined by the two measures of "position" and/or "posture" of the device and/or of the body part that is to operate the device, and the circuit is made dependent on these measures above and beyond the normal usual switching measures.

Position is defined as the position, the site, the location of the device.

Posture is defined as the attitude/position of the operating body part, usually the hand, with respect to the device.

It is thus apparent that the main advantage of the present invention is that the device receives current only if it is in a necessarily prescribed safe state (position) and/or if the hand (body part) operating the device is in the correct posture for this purpose.

The object of the present invention, is achieved by combining the following conditions or characteristics:

1. High safety for the operator and the surrounding environemnt, with respect to:
   a) When is the device turned on, when is it turned off?

b) What voltage is used?

2. It must not be easy to manipulate or by-pass the switch (bridging, gluing, etc.).

3. The switch must be insensitive to outside influences or forces as much as possible.

4. The switch must be easy to manufacture and produce and usable in devices.

The basic idea of the invention is thus not to merely turn off a device—as has usually been done in the past in the case of a malfunction, i.e., a danger,—but to ensure that the device is turned on only if it is completely properly operated and thus to counteract all possible malfunctions and danger points.

This is achieved according to the invention by ensuring that the safety switch can be activated, not as has usually been done in the past, by only one condition (a push button is depressed) being met; but rather, several conditions must be met simultaneously and/or in sequence.

According to the invention, this means that in an embodiment such as in FIGS. 5 and 6 of U.S. Pat. No. 3,651,391 two sensor switches would have to be provided for each body aprt, i.e., a total of four for the device.

According to the first condition, contact with human skin i.e. the person operating or using the device, or iwth the ground potential corresponds to depressing the prior known mechanical safety switch.

As the second condition, position is introduced as an additional safety factor. The posture of the body part (hand) of the person in contact with the device and/or the position of the device itself.

For example, the positions of at least two contact elements, must respectively be placed so that they can be reached by the body part only if a person's hand assumes a predetermined posture on the device and, if necessary, also exerts a predetermined pressure. This can be determined in advance by the sensitivity of the contact plate of the sensor switch and the control electronics.

In addition, the control voltage should be completely harmless. This is achieved according to the present invention by using the ground potential as a control pulse, and the circuit thus works with no source of electric current.

The sensor switch can be neither bridged electrically nor mechanically fixed.

The sensor safety circuit is insensitive as much as possible to outside influences, since the control electronics can be encapsulated in plastic, and the simple contact surfaces offer very little opportunity for outside effects or forces and also contain no moving mechanisms.

Production is readily possible, since this is a new combination of known parts, in a specific arrangement, with a new object and an unobvious result. In terms of installation, this new sensor safety circuit allows the manufacturer of such a device more options than in the case, of thee previous mechanical safety switches.

BRIEF DESCRIPTION OF THE DRAWING

Other objects and advantages of the present invention will be apparent upon reference to the accompanying description when taken in conjunction with the following drawings, which are exemplary, wherein.

DESCRIPTION OF THE PREFERRED EMBODIMENTS

Figure 1:
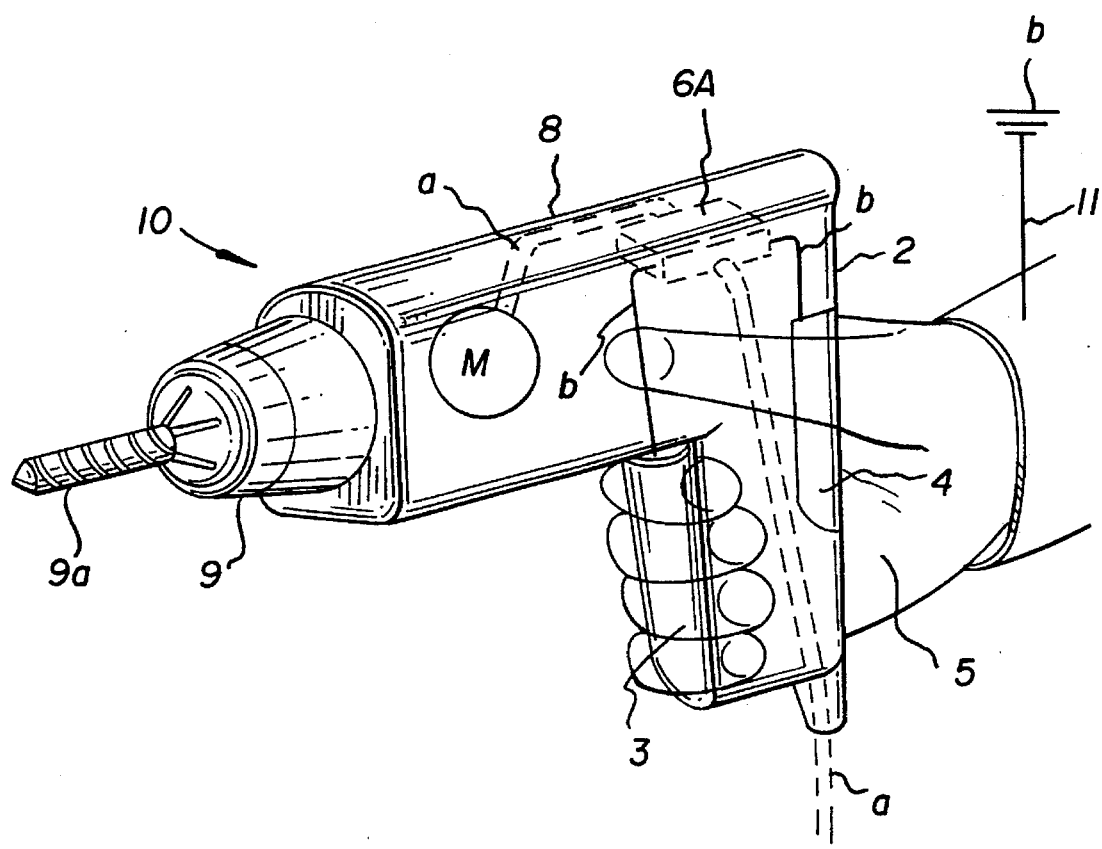
FIG. 1 is a perspective view of a hand drill incorporating the present invention and held by the user.

As may be seen in FIG. 1, a hand drill incorporating the present invention is indicated generally at 10 and is of the type which has a hand or pistol grip 2. The pistol grip extends downwardly from one end of a body, portion 8 and the other end has a chuck 9 from which extends a bit or drill 9a as known in the art. The hand grip 2 is provided with contact plates 3 and 4 so disposed as to be contacted by the hand 5 of a person using the hand grip as shown in FIG. 1. The contact plates 3 are insulated from each other and from the hand drill 10 and are recessed in the handle 5 of the hand drill in such a manner that both contacts 3 and 4 are touched or contacted only when the person correctly holds the hand drill 10 in one hand, or if so desired in both hands.

An electronic control circuit 6A which may be encapsulated in plastic, is mounted within the body 8 of the hand drill and is connected to electric leads a to a electric drive motor M. The electrical leads a also extend from the other side of the control circuit downwardly through the handle 2 and outwardly at the bottom thereof to a source of electrical energy. The control circuit 6A thus controls the flow of electrical operating current to the drive motor M.

Figure 4:
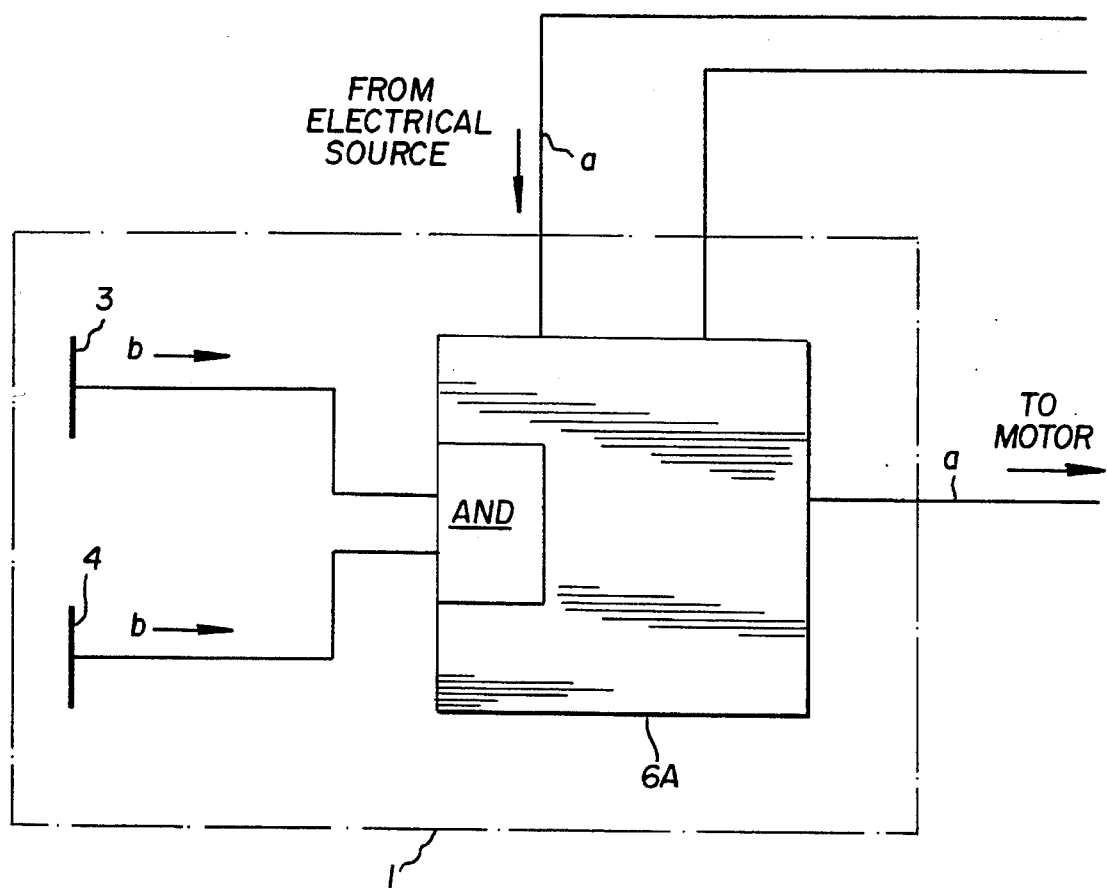
FIG. 4 is a schematic view of the wiring diagram for the hand drill according to FIG. 1.

Thus, the band 5 of the user, as shown in FIG. 1 brings a ground potential 11, which is specific to this particular person to the contact plates 3 and 4. The electronic control device 6A then transmits the operating current through the leads a for the drill only if the ground potentials d are both present from both contacts 3 and 4. The electrical circuit utilized for this purpose is shown in FIG. 4 wherein 1 indicates the sensor safety switch. It is also within the scope of this invention to utilize the current produced by the two ground potentials b for switching since the intensity of the ground potential d increases as the user more tightly grips the handle and thus the electrical contacts 3 and 4.

If hand 5 (or hands) must leave the specified posture or have too loose a grip, the device immediately turns off.

Figure 2:
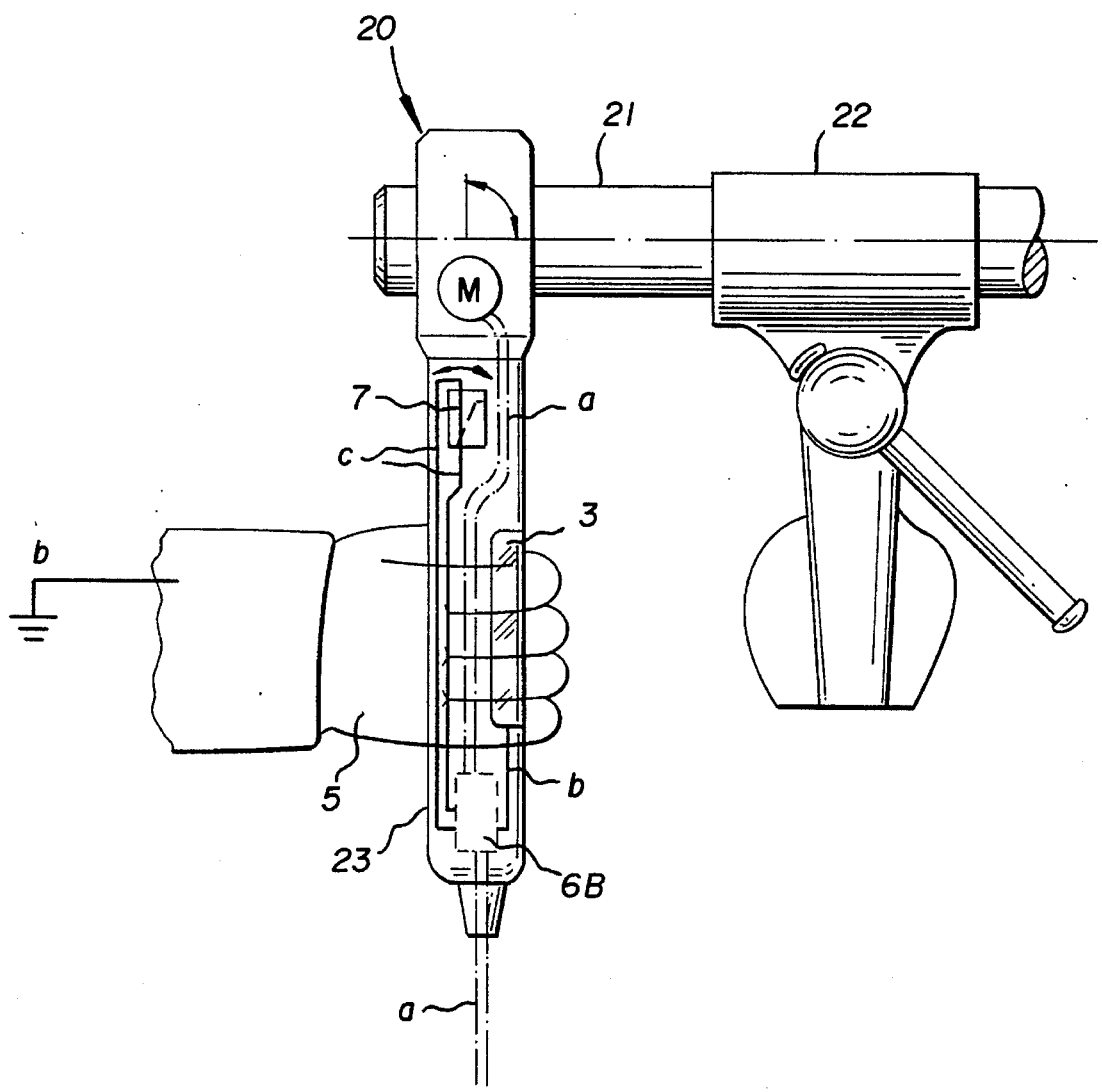
FIG. 2 is a side elevational view of an electric thread cutter.
Figure 5:
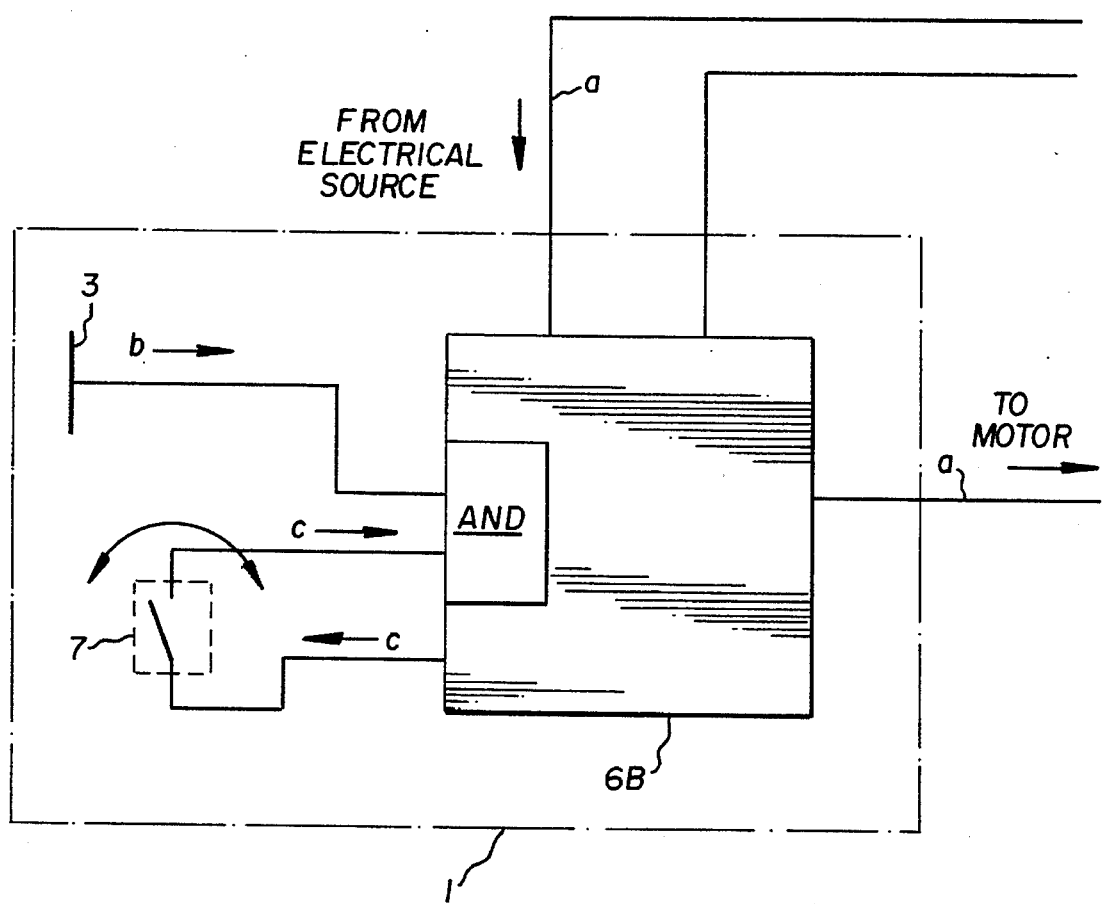
FIG. 5 a schematic view of the wiring diagram for the thread cutter according to FIG. 2.

In FIG. 2, there is indicated generally at 20 an electric thread cutter which incorporates the present invention. The thread cutter 20 is shown cutting threads on an end of a pipe 21 which is secured in a vice 22 in a known manner. The electric thread cutter 20 is provided with an elongated hand grip 23 upon which is mounted a single contact 3 which is gripped by the hand 5 of the operator when using the thread cutter. The thread cutter is further provided with a position or tilt switch 7 which switches another control signal c to the controlled electronic unit 6B as shown in FIG. 5. Thus, when the ground potential d generated by the hand of the user and position switch c transmits a control signal c to the electronic unit 6B this electronic unit will then permit the flow of electrical current through leads a to the motor 7 in a manner as described above.

This electric thread cutter 20 should not be tilted beyond a certain predetermined angle. Contact element (3) is recessed in the handle 23 and insulated from the thread cutter in such a way that a person touches contact 3 only when using it properly. Ground potential (b) that is specific to it is thus brought to the contact plate which sends it on to control electronics 6B.

The switch (7), whose switching state is dependent on its position, vertical or horizontal, sends a pulse (c) to control electronics (6) when the electric thread cutter is in the correct position. If both pulses are present, control electronics 6B puts operating current (a) through to the motor M.

Figure 3:
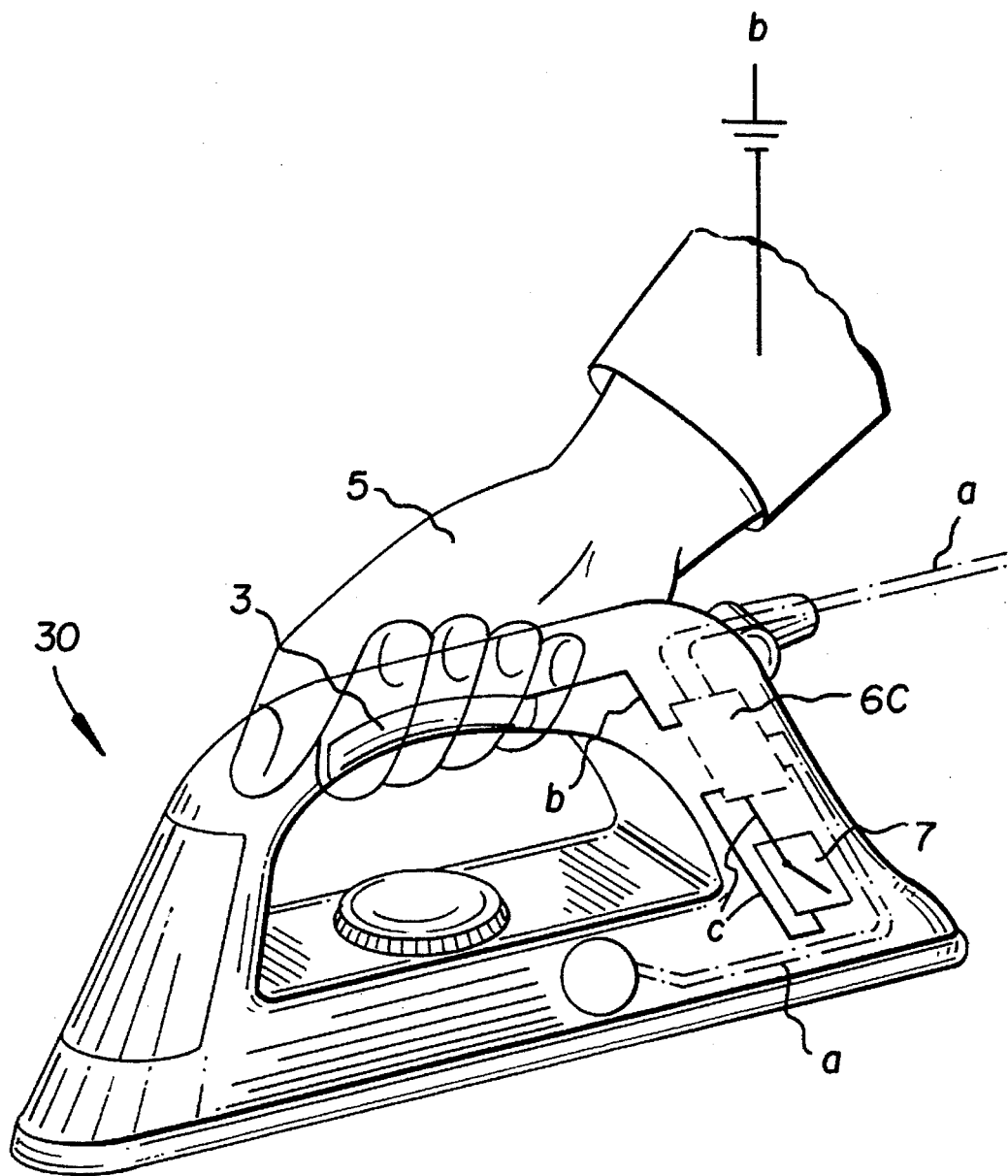
FIG. 3 is a perspective view of an iron.

According to FIG. 3 an electric iron 30 is provided, which has a contact plate (3) built in, insulated from the device, such that a person touches it with his hand (5) when properly using the iron. The ground potential that is specific to the person is thus transferred to contact plate (3). The plate sends the potential to control electronics 6C shown in FIG. 6.

Position switch (7), whose switching state is dependent on its position, vertical or horizontal, directs a pulse (c) to control electronics 6C only if the iron is in the upright position as shown. The latter puts through operating current (a) only if at least one of two pulses (b or c) is present. This means: the iron is held in the hand or is set down correctly in the upright position.

In this embodiment of FIG. 3, the basic concetp of the invention: "to turn on, if operated properly" is clearly demonstrated. All possible malfunctions are thus excluded. The only thing is that this is the special case where proper operation does not have to be limited absolutely to a certain time and date, but can take place at different times and in different ways.

In the embodiment according to FIG. 3, the person's hand (5), shown, brings earth potential (b) that is specific to it to contact plate (3). The latter controls the control electronics 6C. Position switch (7) switches another control signal (c) to control electronics 6C when the iron is set down properly, in the upright position. Control electronics 6C transmits operating current (a) to the hot plate of the iron when at least one control pulse (c or b) is present.

Figure 6:
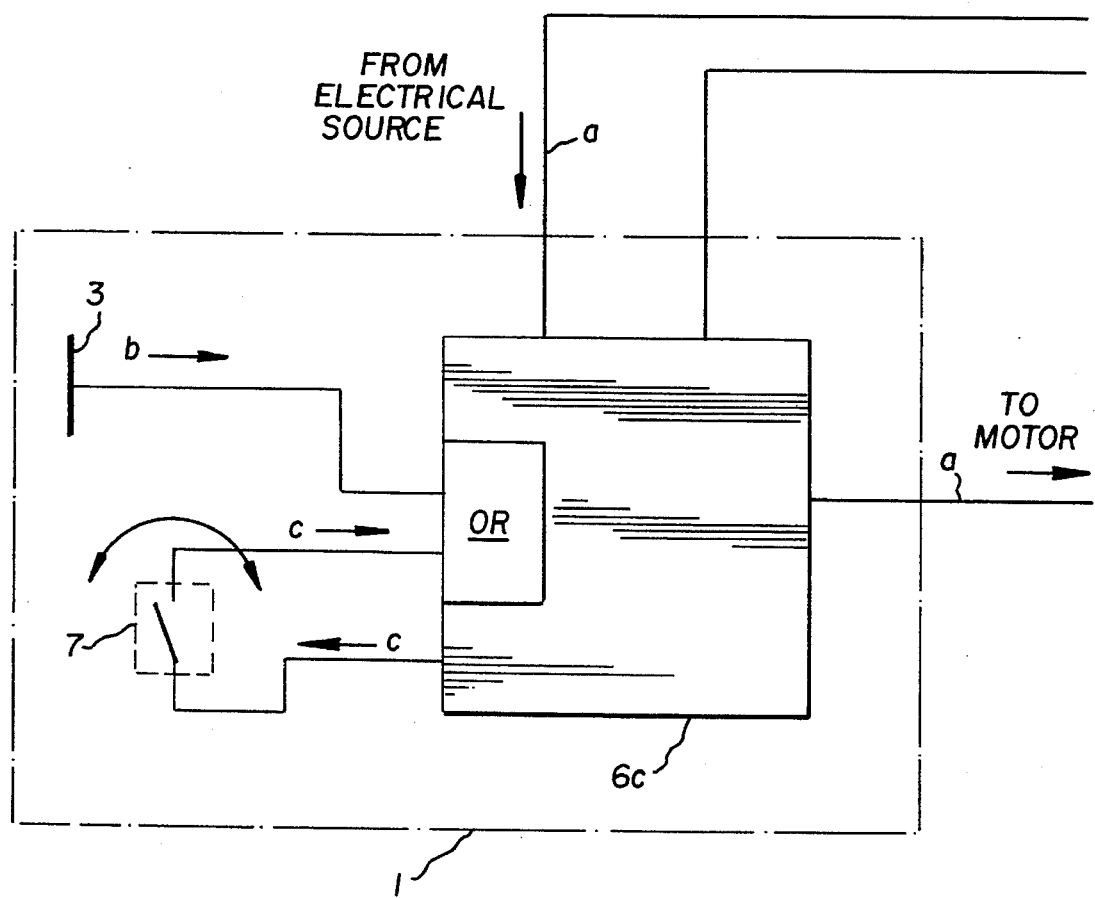
FIG. 6 is a schematic view of the wiring diagram for the iron according to FIG. 3.

It is to be noted that in FIG. 6, the electronic unit 6C is provided with an OR which controls a control signal from either a sensor 3 or the position switch 7. In FIG. 5, the electronic unit 6B is provided with an AND circuit which requires both control signals from both the sensor or contact 3 and position swtich 7 in the thread cutter 20 of FIG. 2. In FIG. 4, the electronic unit 6A is also provided with an AND circuit for transmitting both control signals from both contacts 3 and 4.

It is thus apparent that the circuit of the invention has the following features:

a) A very high degree of safety. The device turns on only when carefully and correctly operated and turns off immediately in case of danger.

b) There is no potential on the contact plates.

c) The contact plates cannot be bridged or fixed as switches.

d) The circuit is fail-safe, since it cannot be influenced from the outside.

e) The circuit is not subject to wear.

f) The circuit can be constructed not to spark.

g) The circuit is static. No mechanism is necessary forthe actuation of the switches.

h) The contact plates are positioned flush with the surface, for example, a handle of the device.

i) Good handling is possible.

The invention thus incorporates the following advances over the prior art:

a) In general, it was necessary to avoid having electrically operated devices that are turned off at the instant of danger; rather, it is preferable for these devices to be turned on only when they are used absolutely safely and correctly, thus eliminating all possible risks.

b) Subsequently, it was necessary to introduce the posture of the person's body part wtih respect to the device, the hand that operates the device, and/or the position of the device itself as decisive safety factors.

c) Finally, the following steps were also necessary:
I. Mechanical devices are replaced by the static sensor switch.

II. No current is put through; rather the ground potential is present.

This invention relates not only to sensor switches that operate with an earth potential. This mode of operation has only one advantageous configuration. It goes without saying that also other sensor switches, for example, capacitively operating switches according to the prior art, can also be used. See in this respect DE 26 27 663 C 2.

The circuits shown in FIG. 2, 4 and 6 also operate just as well with other sensors on the devices connected to them, for example, capacitive operating sensors.

We claim:

1. Safety circuit in hand operated electrical devices having a hand grip for a hand of the user, comprising a plurality of interacting switch elements to enable electric current to flow from an external source to an electric drive motor in said device, at least two of said switch elements are disposed on the hand grip that triggers a function of the switch elements; said switch elements comprising electronically operating contact elements insulated from one another and from the device, said contact elements being so positioned on the hand grip that the contact elements are simultaneously touched by the user's hand only when said user's hand is in the proper and correct operating posture with respect to the device to enable the flow of electric current to operate the device.

2. Safety circuit in hand operated electrical devices having a hand grip for a hand of the user comprising a plurality of interacting switch elements to enable current to flow from an external source to an electric drive motor in said device, at least two of said switch elements are disposed on said device, at least one of said switch elements comprises a contact element insulated from the device, and is so disposed on the hand grip that the contact element is touched by the user's hand only when the user's hand is in the proper and correct operating position with respect to the device, and the other switch element responds to the positioning of the device in its correct operating position to enable the flow of electric current to operate the device when the contact element of said one switch element is simultaneously touched by the user's hand.

3. Safety circuit of claim 2, wherein the switch elements are placed in an AND-circuit or an OR-circuit.

4. Safety circuit of claim 1 or 2, wherein the switch elements respond to one another in a time-staggered fashion.

5. Safety circuit of claim 1 or 2, wherein the contact elements respond to the earth potential.

6. Safety circuit of claim 1, wherein connecting the contact elements of the switch elements to one another electrically but without earth potential does not trigger control electronics (6).

7. Safety circuit of claim 1 or 2, wherein the contact elements are matched to the contact intensity by the user's hand.

8. Safety circuit of claim 1 or 2, wherein the operating voltage is immediately turned off in the event of mishandling.

9. Safety circuit of claim 1 or 2, wherein the contact elements are placed in the area of the handle of a movable operating device.

10. Safety circuit of claim 1 or 2, wherein the contact elements are fixed in place.

11. Safety circuit of claim 1 or 2, wherein the contact elements end flush with the surface of the hand grip or handle.

12. Safety circuit of claim 1 or 2, wherein the contact elements are placed in a watertight arrangement in the surface of the hand grip or handle.

* * * * *